(12) United States Patent
Weissenborn et al.

(10) Patent No.: US 7,052,056 B2
(45) Date of Patent: May 30, 2006

(54) BUMPER SYSTEM WITH ENERGY ABSORBER

(75) Inventors: Mark Weissenborn, Grand Rapids, MI (US); Darin Evans, Wixom, MI (US); Robert Weykamp, Grand Haven, MI (US); David Powell, Grand Haven, MI (US)

(73) Assignee: Netshape Corporation, Farmington Hills, MI (US)

( * ) Notice: Subject to any disclaimer, the term of this patent is extended or adjusted under 35 U.S.C. 154(b) by 0 days.

(21) Appl. No.: 10/694,278

(22) Filed: Oct. 27, 2003

(65) Prior Publication Data

US 2004/0084911 A1    May 6, 2004

Related U.S. Application Data

(62) Division of application No. 10/163,586, filed on Jun. 6, 2002, now Pat. No. 6,672,635.

(51) Int. Cl.
 *B60R 19/03* (2006.01)
(52) U.S. Cl. ...................................... 293/120
(58) Field of Classification Search ............... 293/120, 293/132, 135, 136, 154, 155, 102, 103, 117; 296/187.02, 187.03, 187.09
See application file for complete search history.

(56) References Cited

U.S. PATENT DOCUMENTS

| | | | |
|---|---|---|---|
| 831,755 A | 9/1906 | Husham | |
| 1,247,569 A | 11/1917 | Palmer | |
| 1,362,439 A | 12/1920 | Roberts | |
| RE15,255 E | 12/1921 | Limacher | |
| 1,429,061 A | 9/1922 | Coe | |
| 1,499,986 A | 7/1924 | Kirsch | |
| 1,927,442 A | 9/1933 | Laufle | |
| 1,952,545 A | 3/1934 | Gotshall | |
| 2,371,671 A | 3/1945 | Blount et al. | |
| 2,566,605 A | 9/1951 | Ekornaas | |
| 2,606,755 A | 8/1952 | Samuels | |
| 2,685,269 A | 8/1954 | Manson | |
| 2,734,407 A | 2/1956 | Smith | |

(Continued)

FOREIGN PATENT DOCUMENTS

DE     3343709     6/1984

(Continued)

OTHER PUBLICATIONS

U.S. Appl. No. 10/163,838, filed Jun. 6, 2002 entitled Bumper With Integral Energy Absorber and Beam (6,663,150).

(Continued)

*Primary Examiner*—H. Gutman
(74) *Attorney, Agent, or Firm*—Price, Heneveld, Cooper, DeWitt & Litton, LLP

(57) ABSTRACT

A bumper system includes a bumper beam having a face and ends, and an energy absorber mounted on the face. The energy absorber has a one-piece injection-molded non-foam piece with box sections and interconnecting straps, and a one-piece or multi-piece foam component securely insert-molded onto the injection-molded non-foam piece. Different foam molds can be used to form differently shaped front surfaces on the foam component. By this arrangement, different energy absorbing systems are provided for vehicles, such as to satisfy the need for different styling and shapes, while still using the same non-foam piece. By this arrangement, the energy absorber is a single unit that can be handled and attached to the bumper beam. At the same time, capital investment in molding dies and tooling is reduced.

7 Claims, 7 Drawing Sheets

U.S. PATENT DOCUMENTS

| | | | | |
|---|---|---|---|---|
| 3,392,566 | A | 7/1968 | Sporck | |
| 3,596,963 | A | 8/1971 | Phillips | |
| 3,762,195 | A | 10/1973 | Kitanosono et al. | |
| 3,768,850 | A | 10/1973 | Barton et al. | |
| 3,777,438 | A | 12/1973 | Brown | |
| 3,827,740 | A | 8/1974 | Golze et al. | |
| 3,860,279 | A * | 1/1975 | Hulten | 293/109 |
| 3,884,517 | A | 5/1975 | Davidson | |
| 3,902,748 | A | 9/1975 | Bank et al. | |
| 3,938,841 | A * | 2/1976 | Glance et al. | 293/120 |
| 3,989,292 | A | 11/1976 | Bank et al. | |
| 4,013,317 | A | 3/1977 | Reidelbach et al. | |
| 4,022,505 | A | 5/1977 | Saczawa, Jr. | |
| 4,061,384 | A * | 12/1977 | Montgomery et al. | 293/109 |
| 4,066,285 | A | 1/1978 | Hall et al. | |
| 4,095,831 | A | 6/1978 | Hagiwara et al. | |
| 4,111,478 | A | 9/1978 | Pompei et al. | |
| 4,165,113 | A | 8/1979 | Casse | |
| 4,186,915 | A * | 2/1980 | Zeller et al. | 267/140 |
| 4,193,621 | A | 3/1980 | Peichl et al. | |
| 4,221,413 | A | 9/1980 | Bonnetain | |
| 4,225,167 | A | 9/1980 | Buettner et al. | |
| 4,233,833 | A | 11/1980 | Balinski | |
| 4,241,146 | A | 12/1980 | Sivachenko et al. | |
| 4,248,072 | A | 2/1981 | Hasegawa et al. | |
| 4,252,355 | A | 2/1981 | Goupy et al. | |
| 4,291,564 | A | 9/1981 | Muckli | |
| 4,317,350 | A | 3/1982 | Sivachenko et al. | |
| 4,320,913 | A | 3/1982 | Kuroda | |
| 4,333,674 | A | 6/1982 | Buettner et al. | |
| 4,361,352 | A | 11/1982 | Wakamatsu | |
| 4,386,799 | A | 6/1983 | Molnar | |
| 4,413,856 | A | 11/1983 | McMahan et al. | |
| 4,422,680 | A | 12/1983 | Goupy | |
| 4,427,189 | A * | 1/1984 | Kimura et al. | 267/139 |
| 4,433,565 | A | 2/1984 | Preller | |
| 4,466,646 | A | 8/1984 | Delmastro et al. | |
| 4,578,979 | A | 4/1986 | Abe et al. | |
| 4,592,580 | A | 6/1986 | Stanganelli et al. | |
| 4,684,166 | A | 8/1987 | Kanodia | |
| 4,714,287 | A | 12/1987 | Merkle | |
| 4,715,630 | A | 12/1987 | Manning | |
| 4,783,104 | A | 11/1988 | Watanabe et al. | |
| 4,796,946 | A | 1/1989 | Wilson et al. | |
| 4,811,979 | A | 3/1989 | Peter et al. | |
| 4,856,833 | A | 8/1989 | Beekman | |
| 4,862,666 | A | 9/1989 | Kero | |
| 4,940,270 | A | 7/1990 | Yamazaki et al. | |
| 4,941,701 | A * | 7/1990 | Loren | 293/155 |
| 4,978,562 | A | 12/1990 | Wycech | |
| 4,988,137 | A * | 1/1991 | Fleming | 293/109 |
| 5,005,887 | A | 4/1991 | Kelman | |
| 5,040,399 | A | 8/1991 | Knapper et al. | |
| 5,056,840 | A * | 10/1991 | Eipper et al. | 293/120 |
| 5,067,759 | A * | 11/1991 | Fleming | 293/109 |
| 5,092,512 | A | 3/1992 | Sturrus et al. | |
| 5,100,187 | A * | 3/1992 | Loren | 293/110 |
| 5,106,137 | A * | 4/1992 | Curtis | 293/107 |
| 5,124,186 | A | 6/1992 | Wycech | |
| 5,139,297 | A | 8/1992 | Carpenter et al. | |
| 5,154,462 | A | 10/1992 | Carpenter | |
| 5,180,629 | A | 1/1993 | Terada et al. | |
| 5,219,197 | A | 6/1993 | Rich et al. | |
| 5,232,261 | A | 8/1993 | Kuroda et al. | |
| 5,277,469 | A | 1/1994 | Klippel | |
| 5,290,078 | A * | 3/1994 | Bayer et al. | 293/120 |
| 5,340,178 | A | 8/1994 | Stewart et al. | |
| 5,385,375 | A | 1/1995 | Morgan et al. | |
| 5,404,974 | A | 4/1995 | Thum et al. | |
| 5,407,239 | A | 4/1995 | Arai et al. | |
| 5,425,561 | A | 6/1995 | Morgan | |
| 5,431,464 | A | 7/1995 | Jones et al. | |
| 5,540,016 | A | 7/1996 | Clausen | |
| 5,545,022 | A | 8/1996 | Rosasco | |
| 5,545,361 | A | 8/1996 | Rosasco | |
| 5,560,662 | A | 10/1996 | Apgar, Jr. et al. | |
| 5,672,405 | A | 9/1997 | Plank, Jr. et al. | |
| 5,746,419 | A * | 5/1998 | McFadden et al. | 267/140 |
| 5,756,167 | A | 5/1998 | Tamura et al. | |
| 5,785,376 | A | 7/1998 | Nees et al. | |
| 5,799,991 | A | 9/1998 | Glance | |
| 5,813,718 | A | 9/1998 | Masuda et al. | |
| 5,857,734 | A | 1/1999 | Okamura et al. | |
| 5,927,778 | A * | 7/1999 | Uytterhaeghe et al. | 293/120 |
| 5,997,058 | A | 12/1999 | Pedersen | |
| 6,000,738 | A | 12/1999 | Stewart et al. | |
| 6,003,274 | A * | 12/1999 | Wycech | 52/232 |
| 6,003,912 | A | 12/1999 | Schonhoff et al. | |
| 6,042,163 | A | 3/2000 | Reiffer | |
| 6,138,429 | A | 10/2000 | Baumgaertner | |
| 6,165,588 | A | 12/2000 | Wycech | |
| 6,168,226 | B1 * | 1/2001 | Wycech | 296/146.6 |
| 6,179,353 | B1 | 1/2001 | Heatherington et al. | |
| 6,217,089 | B1 | 4/2001 | Goto et al. | |
| 6,276,105 | B1 | 8/2001 | Wycech | |
| 6,318,775 | B1 | 11/2001 | Heatherington et al. | |
| 6,406,081 | B1 | 6/2002 | Mahfet et al. | |
| 6,428,064 | B1 | 8/2002 | Frederick | |
| 6,755,452 | B1 * | 6/2004 | Cate et al. | 293/120 |
| 6,758,507 | B1 * | 7/2004 | Tarahomi et al. | 293/120 |
| 6,793,256 | B1 * | 9/2004 | Carley et al. | 293/109 |
| 6,817,638 | B1 * | 11/2004 | Choi et al. | 293/109 |
| 2001/0017473 | A1 | 8/2001 | Yamamoto | |
| 2002/0149213 | A1 | 10/2002 | Weissenborn | |
| 2002/0149214 | A1 | 10/2002 | Evans | |
| 2003/0132640 | A1 | 7/2003 | Weissenborn et al. | |

FOREIGN PATENT DOCUMENTS

| | | | | |
|---|---|---|---|---|
| EP | | 563548 | 10/1993 | |
| GB | | 645721 | 11/1950 | |
| GB | | 2027516 | 2/1980 | |
| JP | | 355102746 | * 8/1980 | 293/120 |
| JP | | 359006152 | * 1/1984 | 293/132 |
| JP | | 169350 | 7/1986 | |
| JP | | 172603 | 8/1986 | |
| JP | | 66008 | 3/1989 | |
| JP | | 240322 | 9/1989 | |
| JP | | 227750 | 10/1991 | |
| JP | | 403266743 | * 11/1991 | 293/120 |
| JP | | 24491 | 2/1993 | |
| JP | | 6286536 | 10/1994 | |
| SU | | 1382693 | 3/1988 | |

OTHER PUBLICATIONS

U.S. Appl. No. 10/163,586, filed Jun. 6, 2002 entitled Bumper System With Foam and Non-Foam Components (6,672,635).

U.S. Appl. No. 10/208,300, filed on Jul. 30, 2002 entitled Bumper for Reducing Pedestrian Injury (6,685,243).

Exhibit A (2001) includes four pictures of a prior art vehicle bumper system on a Ford Focus model vehicle, which includes a steel beam and an energy absorber that wraps around ends of the beam. The energy absorber includes a lower-density black foam body and has several higher-density white foam blocks inset into an inner surface of the black foam. (Note: Photo 1 shows an "extra" energy absorber loosely setting on a rear bumper system of a Ford Focus, the "extra" energy absorber being reversed to show its inner surface with the white foam blocks exposed.).

* cited by examiner

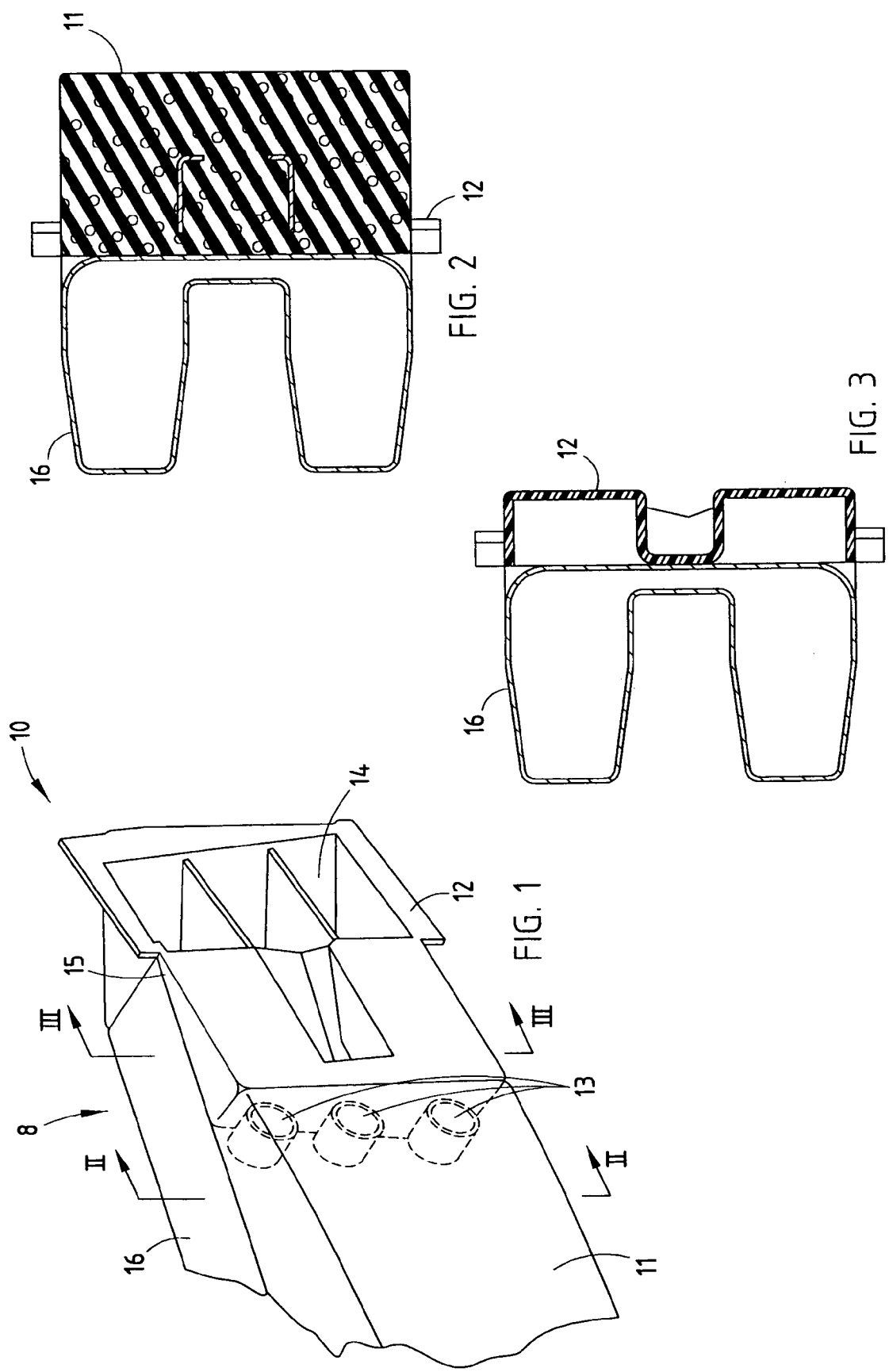

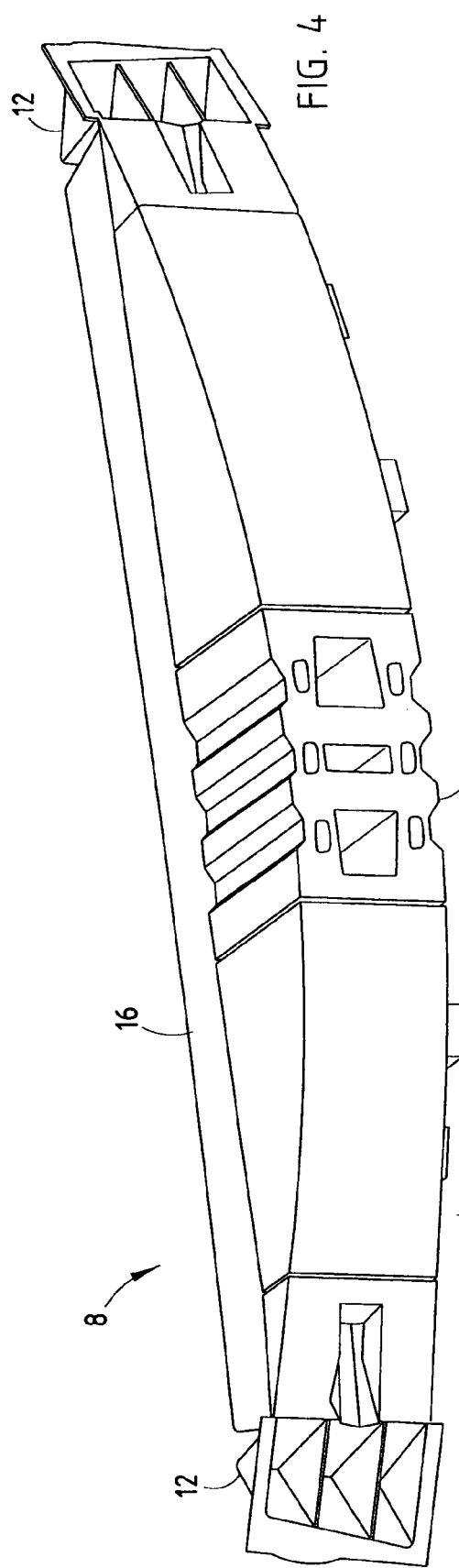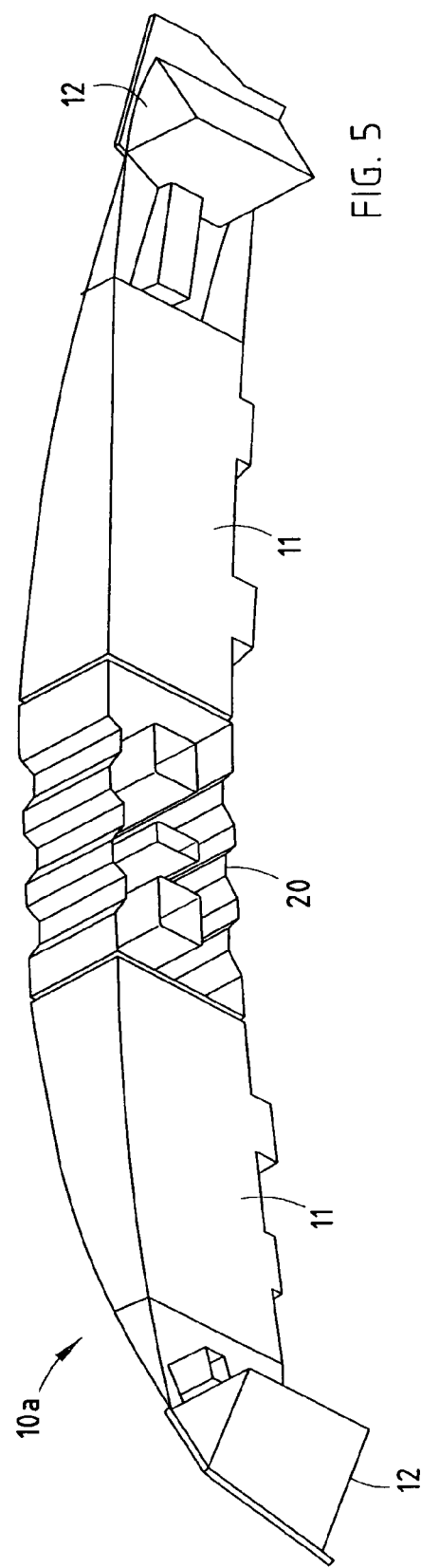

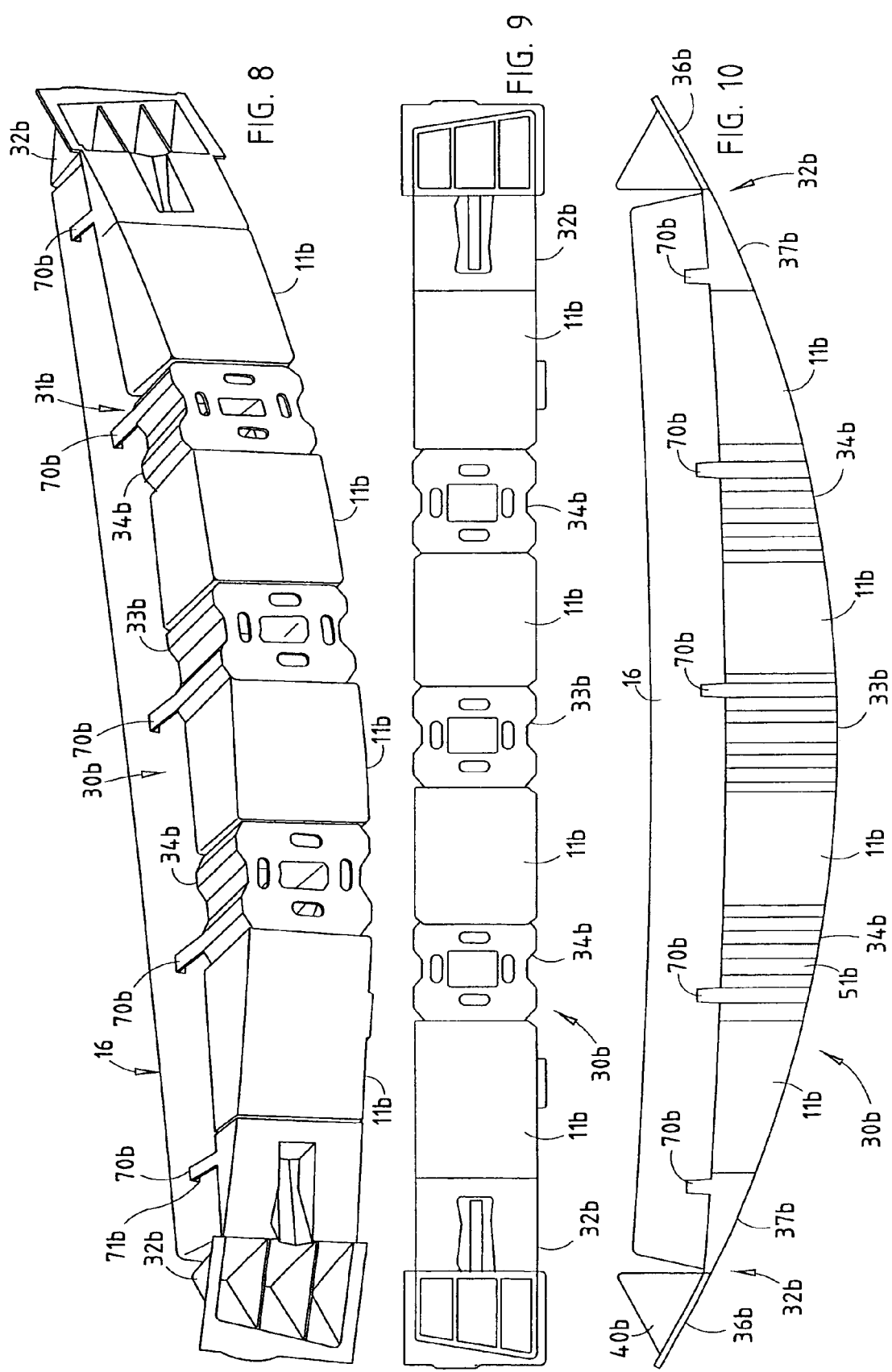

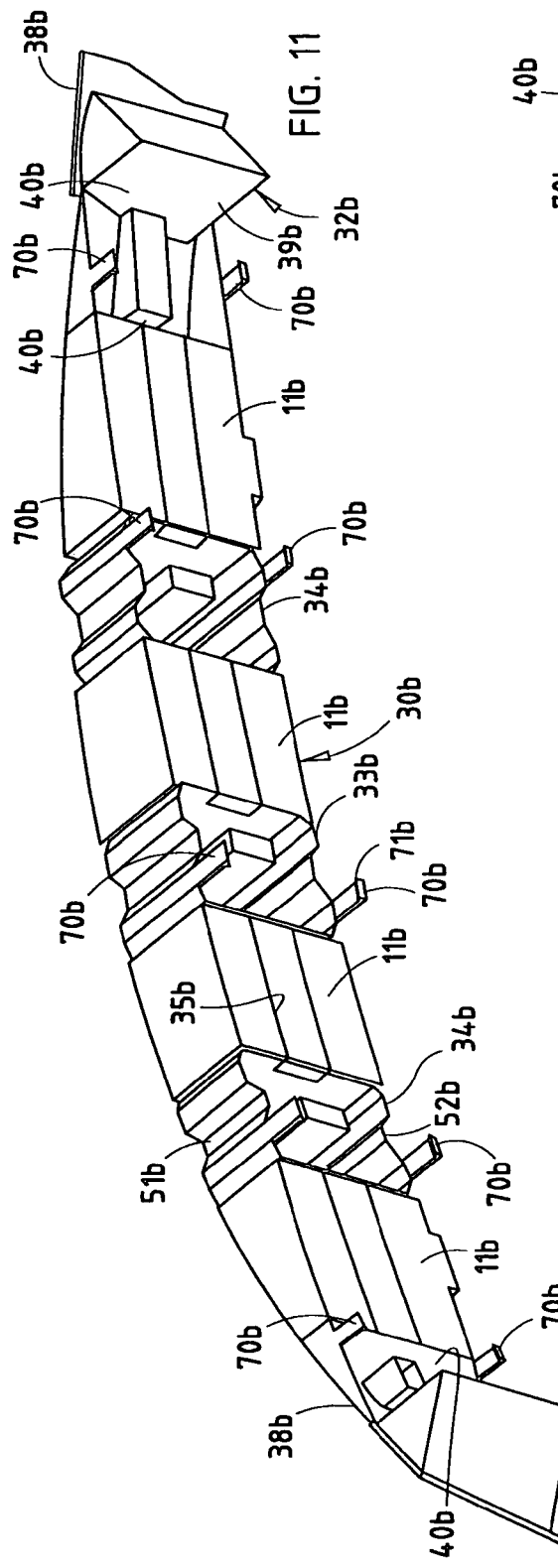
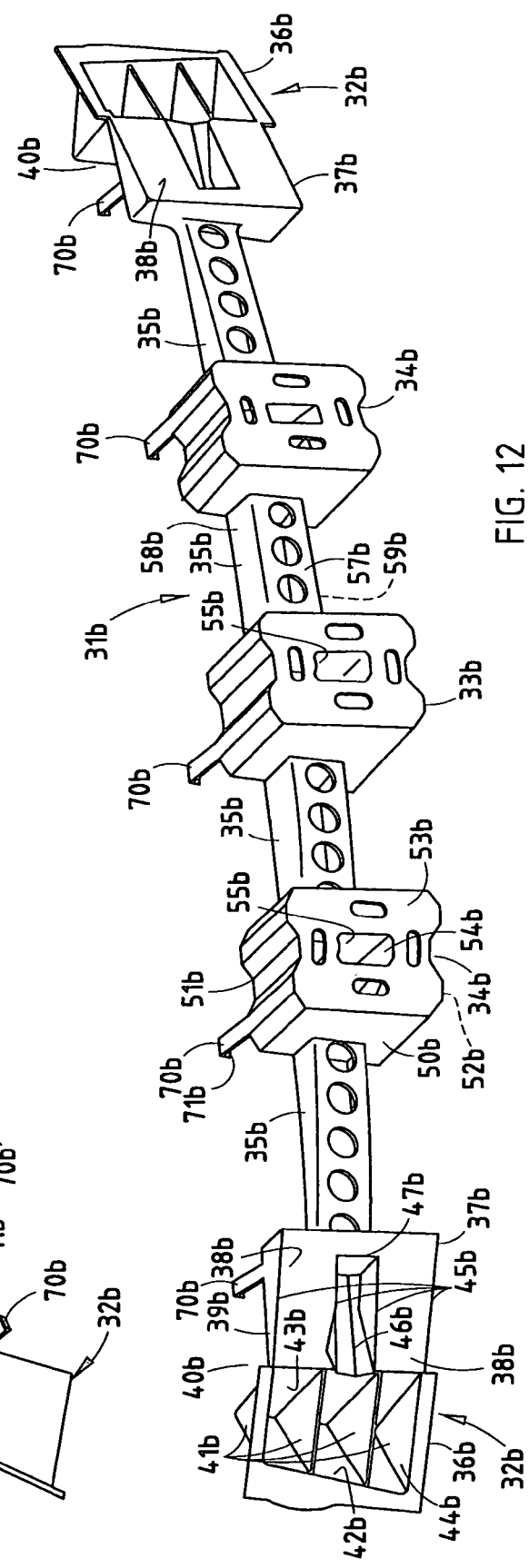

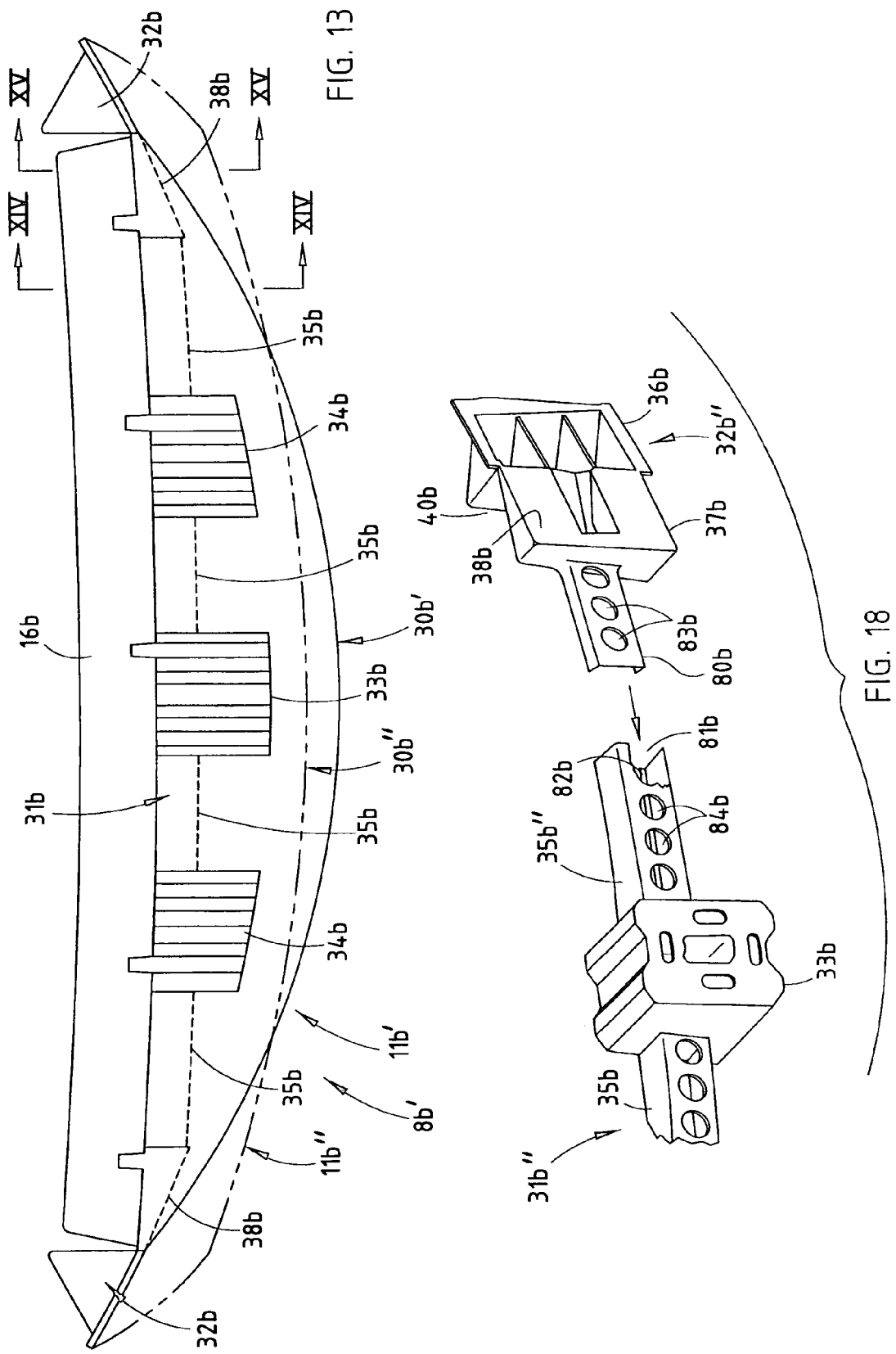

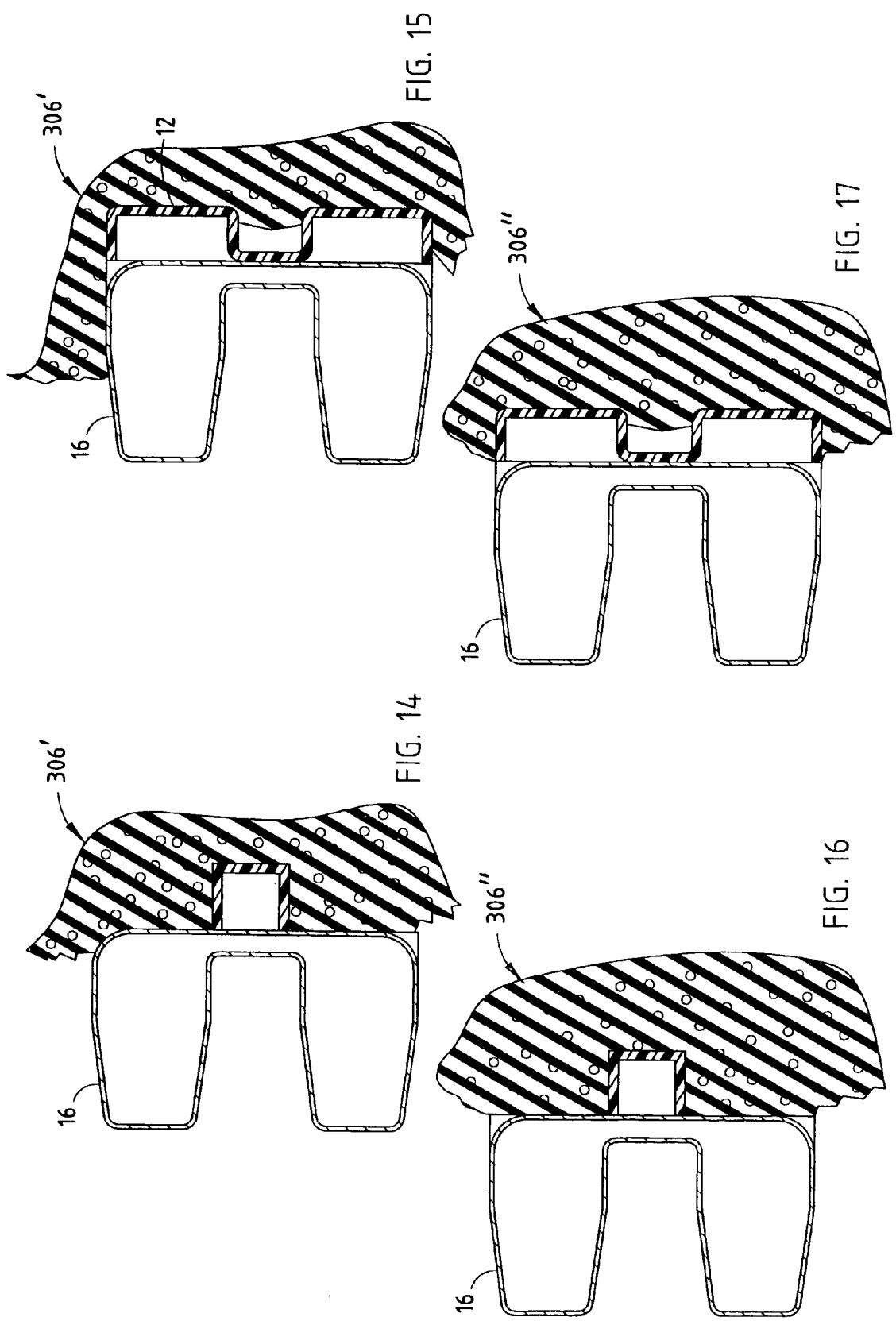

BUMPER SYSTEM WITH ENERGY ABSORBER

CROSS-REFERENCE TO RELATED APPLICATION

This application is a divisional of commonly assigned, co-invented application Ser. No. 10/163,586 filed on Jun. 6, 2002, entitled BUMPER WITH INTEGRATED FOAM AND NON-FOAM COMPONENTS, now U.S. Pat. No. 6,672,635.

BACKGROUND

The present invention relates to vehicle bumper systems having an energy absorber on a bumper beam, and more particularly relates to a bumper system having an energy absorber on the beam that is adapted to provide different levels of energy absorption in selected areas but further adapted to take maximum advantage of mass production.

Vehicle bumper systems often include a bumper beam for strength and a mounted energy absorber to help absorb energy and distribute stress across the bumper beam during impact. However, each different model vehicle requires a slightly different shape or different energy absorption profile, such that each different model vehicle requires a different mold for the energy absorber. Each additional mold is expensive, because they are relatively large and long. Further, it takes time and labor to change molds, and requires downtime of the molding machine.

Accordingly, a bumper system is desired that includes an energy absorber solving the aforementioned problems and having the aforementioned advantages.

SUMMARY OF THE PRESENT INVENTION

In one aspect of the present invention, a bumper system has a face and ends, and has an energy absorber mounted on the face. The energy absorber has an injection-molded piece and a foam piece attached to the injection-molded piece, with the injection-molded piece being one-piece with box-shaped sections interconnected by strap sections, and with the foam piece being one-piece and encapsulating the straps and engaging at least a side of the box-shaped sections.

In another aspect of the present invention, a bumper system includes a bumper beam having a face surface, and an energy absorber engaging the face surface, where the energy absorber has an elongated non-foam injection-molded component with at least three longitudinally-spaced enlarged sections. An enlarged foam component is attached to the injection-molded component, with the enlarged foam component having first foam sections positioned between the enlarged sections and having second foam sections on the enlarged sections.

In yet another aspect of the present invention, a method comprises steps of molding a non-foam plastic component having box sections and strap sections connecting the box sections, and molding a foam component that encapsulates at least three sides of the strap sections and that is bonded to at least part of the box sections, including forming a final product that can be handled as a unit. The method further includes engaging the unitary member against a face of a bumper beam.

In still another aspect of the present invention, a method comprises steps of providing molding dies for molding a non-foam plastic component having box sections interconnected with strap sections, such that the plastic component is shaped for use in a bumper system for providing an energy-absorbing impact strength, and also providing at least first and second molds for molding first and second foam components onto the plastic component, the first and second molds having respective cavities configured to form differently shaped front surfaces on the first and second foam components. The method includes molding the non-foam plastic component using the molding dies, and using the selected one mold in a molding process to form an associated one of the foam components, including attaching the associated foam component to the one of the non-foam plastic components to form a first energy absorber bumper product that can be handled as a unit. The method further includes engaging the unitary bumper product against a face of a bumper beam.

These and other aspects, objects, and features of the present invention will be understood and appreciated by those skilled in the art upon studying the following specification, claims, and appended drawings.

BRIEF DESCRIPTION OF DRAWINGS

FIG. 1 is a fragmentary perspective view of a bumper system including a bumper beam and a face-mounted energy absorber;

FIGS. 2–3 are cross sections taken along the lines II—II and III—III in FIG. 1;

FIG. 4 is a front perspective view of a second bumper system including a bumper beam and a modified face-mounted energy absorber;

FIG. 5 is a rear perspective view of the energy absorber shown in FIG. 4;

FIGS. 8–10 are front perspective, front, and top views of a third bumper system;

FIG. 11 is a rear perspective view of the energy absorber shown in FIG. 8;

FIG. 12 is a front perspective view of an injection-molded non-foam "solid" plastic component of the energy absorber shown in FIG. 8; and FIG. 13 is a top view of a fourth bumper system, utilizing the injection-molded non-foam plastic component shown in FIG. 12 but having first and second enlarged foam components molded thereon, the first being shown in solid lines, the second in phantom lines;

FIGS. 14–15 and FIGS. 16–17 are cross sections taken along the lines XIV—XIV and XV—XV, respectively. FIGS. 14–15 are cross sections of the embodiment shown in solid lines, and FIGS. 16–17 are cross sections of the embodiment shown in phantom lines; and FIG. 18 is an exploded view of a modified version of the non-foam component shown in FIG. 12.

DETAILED DESCRIPTION OF PREFERRED EMBODIMENTS

Figure 6:
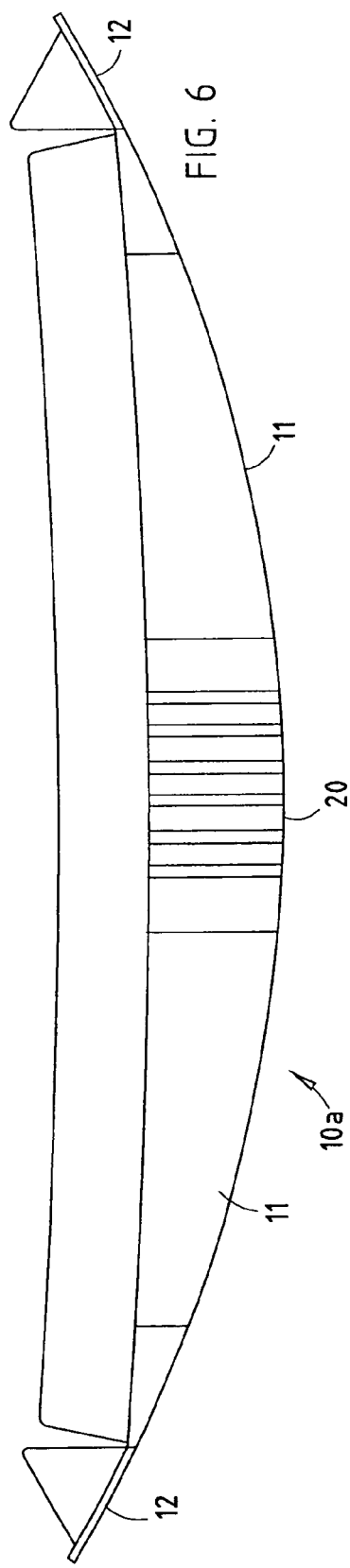
FIGS. 6–7 are top and front views of FIG. 4.

A bumper system 8 (FIG. 1) includes a bumper beam 16 having a face and ends, and an energy absorber 10 mounted on the face. The energy absorber 10 has a center-located foam piece 11 engaging the face and an injection-molded end piece 12 securely attached to each end of the foam piece and also engaging the face. By this arrangement, the energy absorber 10 is a single unit that can be handled and attached to the bumper beam 16. Also, the energy absorber 10 can include different end pieces while still using the same foam piece, or alternatively, the energy absorber can include different center pieces while using the same injection-molded non-foam end pieces. Thus, the present inventive concepts provide the advantages of smaller molding dies for molding the injection-molded non-foam components. This is important because molding dies for injection-molded components are considerably more expensive than molding dies for foam components. At the same time, the present methods and apparatus provide the advantages of a single large energy absorber component that can be handled.

More specifically, the illustrated energy absorber 10 of FIG. 1 is adapted to advantageously use a common center piece 11 made of foam, and any one of a variety of different injection-molded end pieces attached to the foam. The illustrated end piece 12 includes loops or attachment flanges 13 and is insert-molded onto an end of the foam piece 11 when forming the foam piece 11. The end piece 12 includes a front surface 14 angled to match the corner of its particular vehicle, and a notched back surface 15 shaped to mateably receive an end of the bumper beam 16 that it rides on. It is contemplated that different attachment means can be used to attach pieces 11 and 12 together, including adhesive, mechanical attachment, different tabs for insert-molding into the foam, and barb-like tabs that can be poked into the foam, etc. Since the same center piece is used for a number of different models, the overall cost of molding dies is greatly reduced. Restated, the cost of several small injection-molding dies for molding a variety of different end pieces, added to the cost of one large die for the foam center piece, is much lower than the cost of making a multitude of different huge injection-molding dies for each energy absorber.

The same principle applies to a bumper system that uses the same end pieces but different foam molding dies. Restated, the cost of a single set of small injection-molding dies for molding the end pieces, added to the cost of several large dies for making different foam center pieces, is much lower than the cost of making a multitude of different huge injection-molding dies. This concept is discussed in greater detail below. (See FIGS. 13–17, and see discussion below.)

Figure 7:
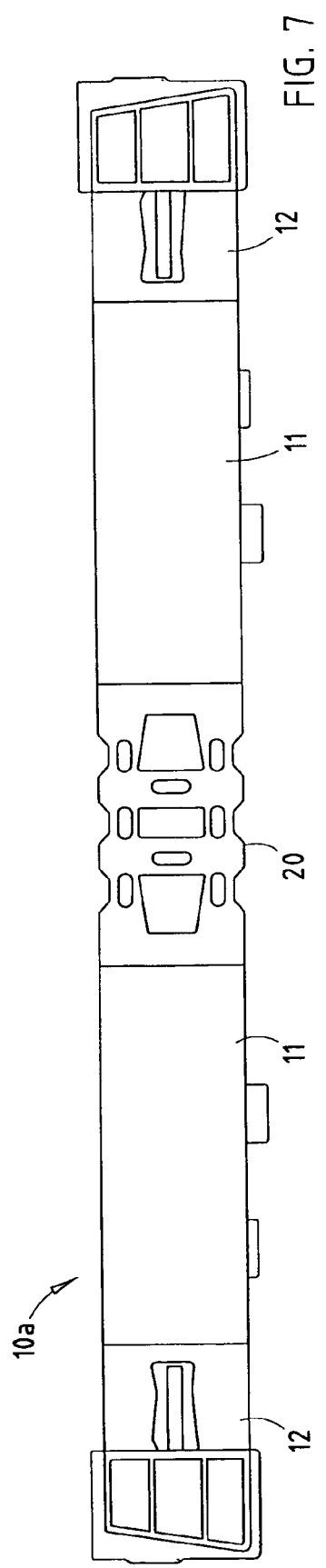

A second energy absorber 10a (FIGS. 4–7) is mounted to a face of a bumper beam 16 and includes a center-located injection-molded non-foam plastic center piece 20, foam pieces 11 attached to each end of the center piece 20, and injection-molded non-foam end pieces 12 attached to outer ends of each of the foam pieces 11. The pieces 11, 12, and 20 are each molded for optimal localized energy absorption (i.e. for an optimal force versus deflection curve, as well as for total energy absorption based on localized/area-specific impacts and based on particular types of impacts). For example, the injection-molded pieces 12 and 20 include a plurality of interconnected webs forming a honeycomb structure capable of substantial energy absorption prior to deformation of the bumper beam itself.

A modified bumper system (FIGS. 8–10) includes a roll-formed B-shaped bumper beam 16 and a modified energy absorber 30b abutted against its face surface. The energy absorber 30b includes an injection-molded piece 31b (FIG. 12), and one or more foam pieces 11b (FIGS. 8–11) molded onto the injection-molded piece 31b. The injection-molded piece 31b (FIG. 12) is molded of a non-foam "solid" polymer and includes molded end sections 32b (similar to end pieces 12), and molded center and intermediate sections 33b and 34b, all interconnected by longitudinal straps 35b. The end sections 32b (when seen in plan view) each include a triangular outer portion 36b and a triangular inner portion 37b forming a rearwardly-swept angled front surface 38b and a stepped back surface 39b with a pocket 40b shaped to receive the end of the beam 16. The outer portion 36b includes four parallel walls 41b that extend parallel a length of the beam 16, and that combine with angled walls 42b and 43b to define a honeycomb-like structure in the form of three forwardly open pockets 44b. The inner portion 37b has four parallel walls 45b that combine with angled walls 46b and 47b to define a rigid structure on the face of the end of the bumper beam 16. The honeycomb-like structure of the outer portion 36b and the inner portion 37b combine to provide optimal energy absorption at ends of the bumper beam 16 for optimal corner impact resistance and crush characteristics. The walls 41b and 45b are generally parallel and aligned with each other and extend in a horizontal plane (when in a car-mounted position), such that good corner impact strength is provided. It is noted that the inner and outer portions 36b and 37b are configured to allow a simple molding die, without the need for making undercuts, blind surfaces, and without the need for complex die pulls and slides.

The center and intermediate sections 33b and 34b (FIG. 12) each comprise rearwardly-open box-shaped sections formed by side walls 50b, a top wall 51b, a bottom wall 52b and a front wall 53b. An opening 54b is formed in each of the front walls 53b, and a centered tubular "crush tower" of material 55b extends rearwardly from the marginal material forming the opening 54b to a rear of the energy absorber. The box-like shape of walls 50b/51b/52b/53b along with the crush tower 55b adds considerably to the impact strength of the energy absorber 30b and adds control over the crush sequence and characteristics of impact and bumper system crush stroke versus energy absorption. If the crush tower 55b ends short of the bumper beam 16, then the crush sequence has a stepped function, where the initial crush strength is a little lower, and when the energy absorber 30b crushes to the point where the crush tower 55b hits the bumper beam 16, the impact strength suddenly increases for additional crush stroke distances. Also, the top and bottom walls 51b and 52b are wavy or undulated to provide increased impact strength.

The straps 35b (FIG. 12) extend between and interconnect each of the sections 32b, 33b, and 34b. Their cross sections define a rearwardly-facing U-shape, and are formed by front wall 57b, and top and bottom walls 58b and 59b. The straps 35b permit flexing movement, until the foam sections 11b are molded onto the pieces 31b, at which time the energy absorber 30b becomes stiff enough to easily handle and assemble onto the bumper beam 16.

It is noted that the entire illustrated energy absorber 30b is configured so that it can be molded by a relatively simple molding die, where the die halves do not include draws, slides, and other moving complex components for making blind and/or hidden surfaces. This greatly simplifies and improves tooling, and reduces costs and capital investment of making the die and keeping the die maintained and operational.

The energy absorber 30b can be attached temporarily to the tubular beam 16 by various means. For example, the illustrated absorber 30b includes rearwardly-extending resilient attachment flanges or "fingers" 70b on top and bottom walls of the energy absorber 30b. The fingers 70b include a protrusion 71b adapted to engage a mating aperture in the beam 16 for temporarily securing the energy absorber 30b to the beam 16. The assembly 30b/16 can then be handled as a unit to facilitate transporting, placing, and then securing the assembly 30b/16 on the vehicle.

FIG. 13 is a top view of a fourth bumper system 8b', utilizing a modified energy absorber 30b'. The energy absorber 30*b*' includes the same injection-molded non-foam plastic component 31*b* shown in FIG. 12, but also includes an enlarged one-piece foam component 11*b*' (shown in solid lines) or one-piece foam component 11*b*" (shown in phantom lines) molded thereon. It is contemplated that the foam piece will be made unique to each different vehicle model (i.e. each different fascia style), but the injection-molded part will be the same for each vehicle model (i.e. despite the different fascia style, the same non-foam part can be used.) Advantageously, the foam component (11*b*' and/or 11*b*") can have a different top surface shape or bottom surface shape. For example, compare the energy absorber 30*b*' illustrated by solid lines in FIG. 13, with the energy absorber 30*b*" illustrated by phantom lines in FIG. 13. Also, compare the energy absorber 30*b*' in FIGS. 13–15, with the energy absorber 30*b*" in FIGS. 13, 16–17.

Energy absorber 30*b*' (or 30*b*") can be further modified as shown in FIG. 18, by making the end piece telescopingly adjustable on the main center piece. In the modification, the end piece 32*b*" is separated from the interconnecting section 35*b*" of center piece 31*b*", and the end piece 32*b*" is given an integrally-formed free-ended interconnecting leg 80*b* shaped to telescope into an open end 81*b* of the interconnecting section 35*b*". The interconnecting section 35*b*" includes inward flanges 82*b* shaped to capture a cross-sectional shape of the interconnecting leg 80*b*, and further the interconnecting leg 80*b* includes protrusions 83*b* shaped to detentingly engage the apertures 84*b* in the interconnecting leg 80*b*. By this arrangement, the end piece 32*b*" can be adjustingly snap-lockingly engaged with the interconnecting section 25*b* to a predetermined length. Thus, the same non-foam injection-molded energy absorber assembly (i.e. center piece 31*b*" and end pieces 32*b*") can be assembled to a desired length for use on a particular model vehicle having a car-width dimension greater than that shown in FIG. 13. It is noted that the telescoping feature (i.e. leg 80*b*) can be located anywhere along a length of the energy absorber, and not just at its end.

It is to be understood that variations and modifications can be made on the aforementioned structure without departing from the concepts of the present invention, and further it is to be understood that such concepts are intended to be covered by the following claims unless these claims by their language expressly state otherwise.

We claim:
1. A bumper system comprising:
   a bumper beam having a face and ends; and
   an energy absorber mounted on the face, the energy absorber having a non-foam polymeric piece and at least one foam piece attached to the non-foam polymeric piece, with the non-foam polymeric piece being one-piece with box-shaped sections interconnected by strap sections, and with the at least one foam piece being one-piece and encapsulating the strap sections and engaging at least a side of the box-shaped sections.
2. The bumper system defined in claim 1, wherein the non-foam polymeric piece is molded to the at least one foam piece during a process of molding the foam piece.
3. A bumper system comprising:
   a bumper beam having a face surface; and
   an energy absorber engaging the face surface, the energy absorber having an elongated non-foam polymeric component with at least three longitudinally-spaced enlarged sections connected by strap sections, and having foam sections positioned between the enlarged sections and covering the strap sections.
4. The bumper system defined in claim 3, wherein the enlarged sections are each box-shaped and have a hollow interior space.
5. The bumper system defined in claim 3, wherein the enlarged sections each include a front wall with marginal material forming an opening therein.
6. A bumper system comprising:
   a bumper beam having a face surface; and
   an energy absorber engaging the face surface, the energy absorber having an elongated non-foam injection-molded component with at least three longitudinally-spaced enlarged sections and a plurality of foam sections attached to the molded component between the enlarged sections;
   wherein the enlarged sections are each box-shaped and have a hollow interior space, and further wherein the enlarged sections each include a front wall with marginal material forming an opening therein.
7. The bumper system defined in claim 6, including a crush tower tube that extends from the marginal material rearwardly toward the bumper beam.

\* \* \* \* \*